March 17, 1953  W. L. PARKER  2,631,571
HYDRAULIC MOTOR AND CONTROL VALVE
Filed March 29, 1948  4 Sheets-Sheet 1

INVENTOR.
WARDE L. PARKER
BY
Herbert E. Metcalf
Attorney

March 17, 1953  W. L. PARKER  2,631,571
HYDRAULIC MOTOR AND CONTROL VALVE

Filed March 29, 1948  4 Sheets-Sheet 2

INVENTOR.
WARDE L. PARKER
BY
Herbert E. Metcalf
Attorney

March 17, 1953
W. L. PARKER
2,631,571
HYDRAULIC MOTOR AND CONTROL VALVE
Filed March 29, 1948
4 Sheets-Sheet 3
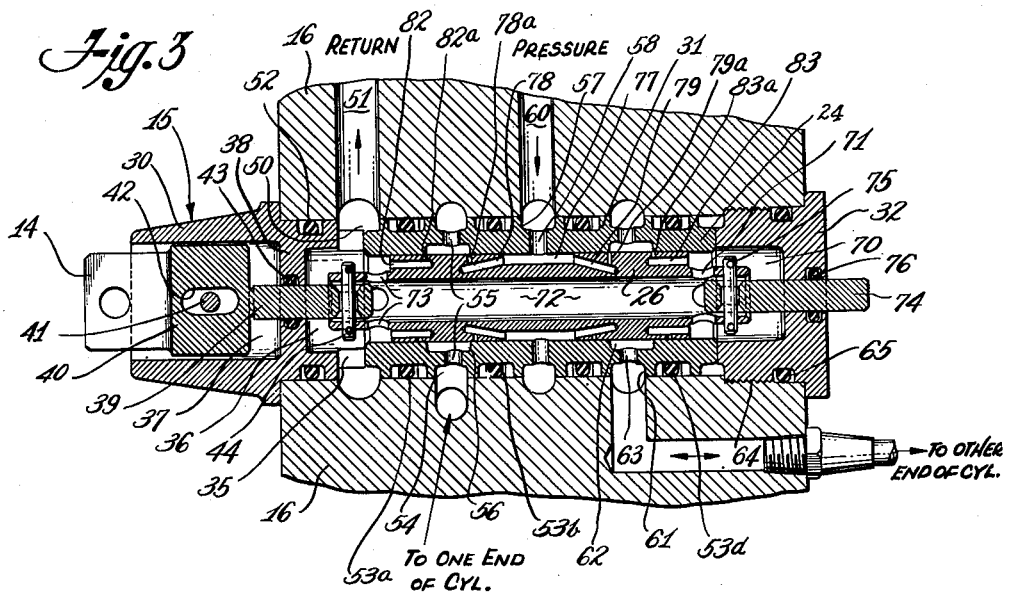
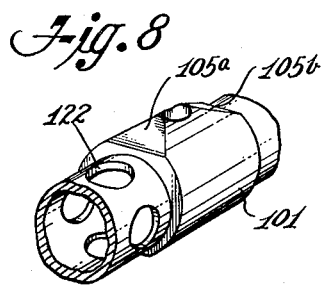
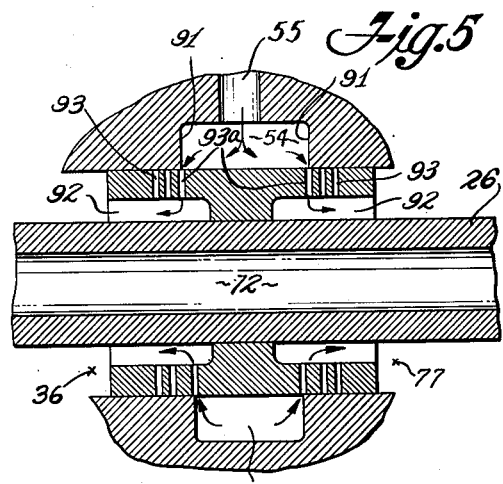
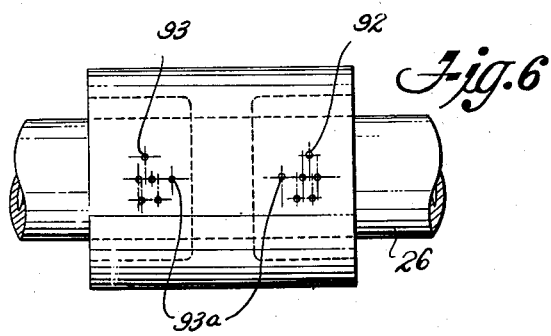
INVENTOR.
WARDE L. PARKER
BY Herbert E. Metcalf
Attorney

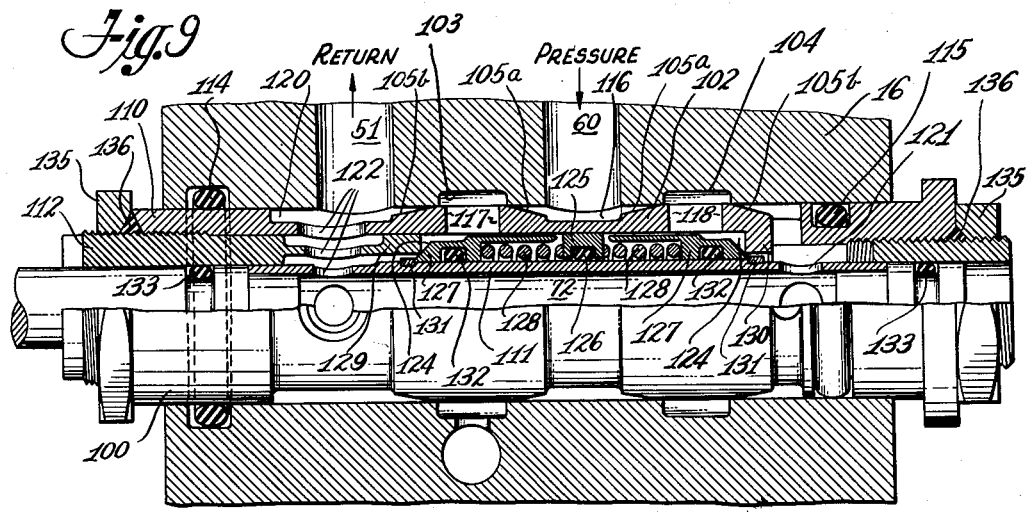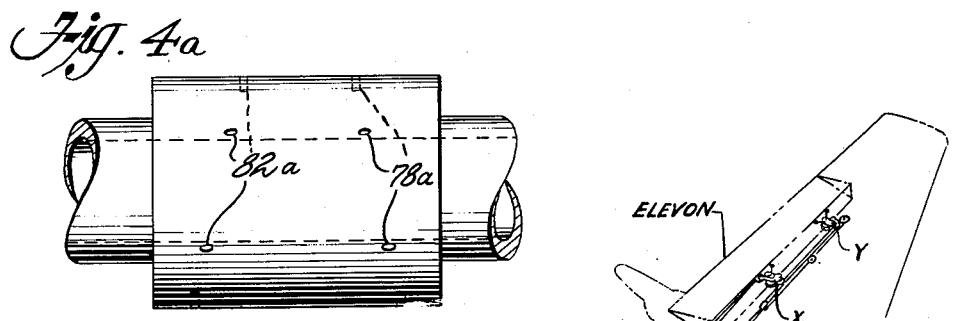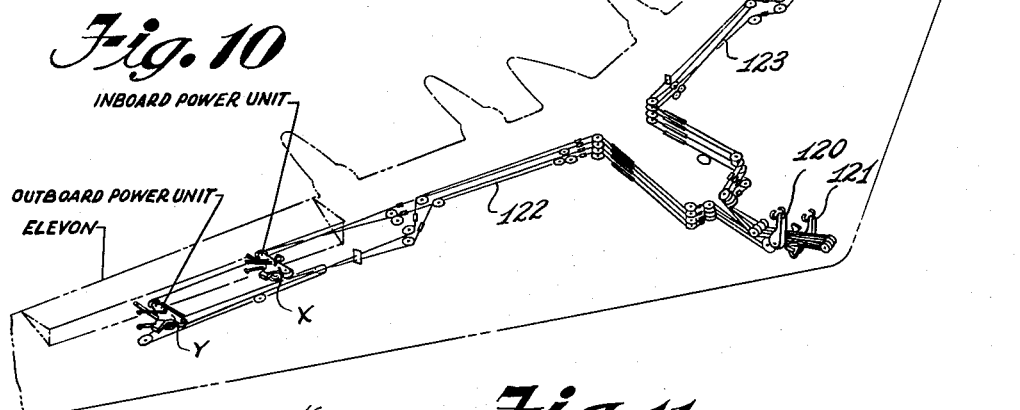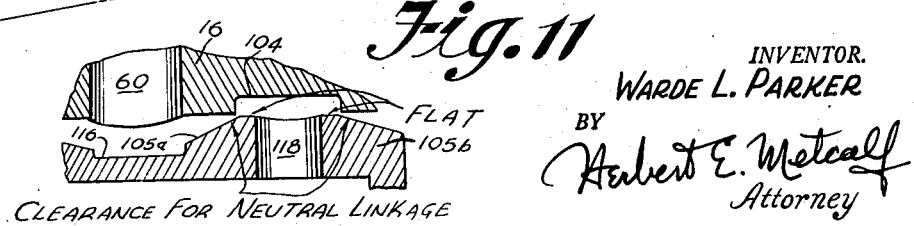

Patented Mar. 17, 1953

2,631,571

UNITED STATES PATENT OFFICE 2,631,571

HYDRAULIC MOTOR AND CONTROL VALVE

Warde L. Parker, Los Angeles, Calif., assignor to Northrop Aircraft, Inc., Hawthorne, Calif., a corporation of California Application March 29, 1948, Serial No. 17,624

9 Claims. (Cl. 121—46.5)

The present invention relates to hydraulic motors and the control therefor, and, more particularly, to a hydraulic motor and valve ideally adapted for full power action of airplane control surfaces under pilot actuation of the hydraulic motor valve.

In U. S. application Serial No. 23,567, filed April 27, 1948, now abandoned, Feeney has described and claimed certain control surfaces for all-wing airplanes, such as those used on the U. S. Army bombers designated as the XB-35 and YB-49. These controls were shown to be full power operated under pilot control, and, as far as is presently known, the XB-35 and YB-49 airplanes are the first large airplanes to be successfully flown with full power operation of the control surfaces, although such power operation was extensively flight tested in a smaller all-wing prototype of the XB-35 prior to use in the latter airplane.

The full powered surface controls of the XB-35 bomber for example, are hydraulically operated under the application of minimum control column force by the pilot, without control surface feed-back or feel being transmitted to the pilot, and the present invention has for an object the provision of a means and method of insuring proper full power operation of airplane control surfaces such as those used in the XB-35 and YB-49 for example.

The XB-35 and YB-49 airplanes are, even for today, very large airplanes having a maximum gross weight of around 200,000 lbs. with a wing spread of 172 ft., the only difference between the two designs being a substitution of jet engines in the YB-49 for the reciprocating engines of XB-35. The control surfaces of these airplanes, such as the elevons, for example, each have an area of approximately 382 sq. ft. With one elevon on each wing panel, these surfaces are moved together for pitch and climb control and separately for roll control. It has been calculated that the pilot might have to exert a stick force under extreme circumstances in flight of over 8000 lbs. in order to move these surfaces for proper flight control if the surfaces were to be controlled manually without power or air boost. Such forces are, of course, highly impractical if not impossible to attain.

Extensive investigation has shown that, for such large control surfaces, auxiliary power systems that boost, but do not entirely remove direct pilot force application, are neither practical nor desirable, and furthermore, are highly complicated. So, during preliminary design studies of the XB-35 airplane, which was flight tested before the YB-49, full power operation of the control surface therefore was thoroughly investigated. After study, hydraulic operation of the control surfaces was decided upon and a large number of the presently known hydraulic motors and control valves were studied and the more promising ones tested. All were failures for dependable airplane control surface operation for one reason or another. During this investigation, it was found that the basic requirements for the successful operation of a hydraulic motor when used for full power operation of airplane control surfaces depend to a large extent on the action of the control valve, which, ideally, should have the following characteristics:

1. There should be a restricted flow to the hydraulic cylinder to prevent chatter.

2. The restriction to the flow should be lessened, but not completely removed, when the valve is displaced to full travel.

3. There should be a constant neutral point leakage to avoid oil hammer due to rapid valve motion and to achieve fine positioning of the control surface.

4. There should be neutral leakage into both ends of the hydraulic cylinder to preload both sides of the cylinder piston, thereby providing rigidity against loads imposed upon the control surface as a result of shock conditions during flight.

5. There should be a minimum of centering forces developed during operation of the valve, to provide low control column forces for operation.

6. The valve must be self cleaning, or constructed to minimize valve malfunctioning due to clogging or jamming.

7. The valve must be capable of free operation in case of failure of hydraulic pressure, in order that control surface operation can be continued by other means.

8. The device must be simple to construct and easy to service.

It was found that none of the available valve structures could meet the above requirements, and it is another object of the present invention to provide a valve for the operation of a hydraulic motor cylinder meeting the above requirements. That these requirements have been fully met by the device of the present invention is amply proved by the successful flights of the all-wing airplanes known as the XB-35, as described above, and its jet driven companion airplane, the YB-49, both of which utilize full power operation of certain of their control surfaces, their elevons and drag rudders in particular, utilizing embodiments of the hydraulic motor of the present invention.

The invention will be more fully understood by reference to the following description relating to the accompanying drawings in which:

Figure 3 is a longitudinal sectional view taken as indicated by the line 3—3 in Figure 2, with a portion of the valve block added.

Figure 4a is a diagrammatic view in elevation of one spool plug portion of the spool used in the device of Figures 3 and 4 oriented to show the spiral flow hole pattern.

Figure 5 is a diagram showing another arrangement of obtaining neutral point leakage and restricted flow in accordance with the present invention.

Figure 6 is a diagram showing the flow aperture pattern in the valve spool of Figure 5.

Figure 8 is a perspective diagram showing bevels made on a spool to provide neutral leakage and restricted flow.

Figure 9 is a longitudinal sectional view of a valve utilizing the bevels of Figure 8 and provided with pressure release means.

Figure 10 is a diagram of an elevon control system utilizing two hydraulic motors.

Figure 11 is a diagrammatic sectional view of a portion of the casing and spool of the valve shown in Figure 9, the clearances being exaggerated.

Figure 1:
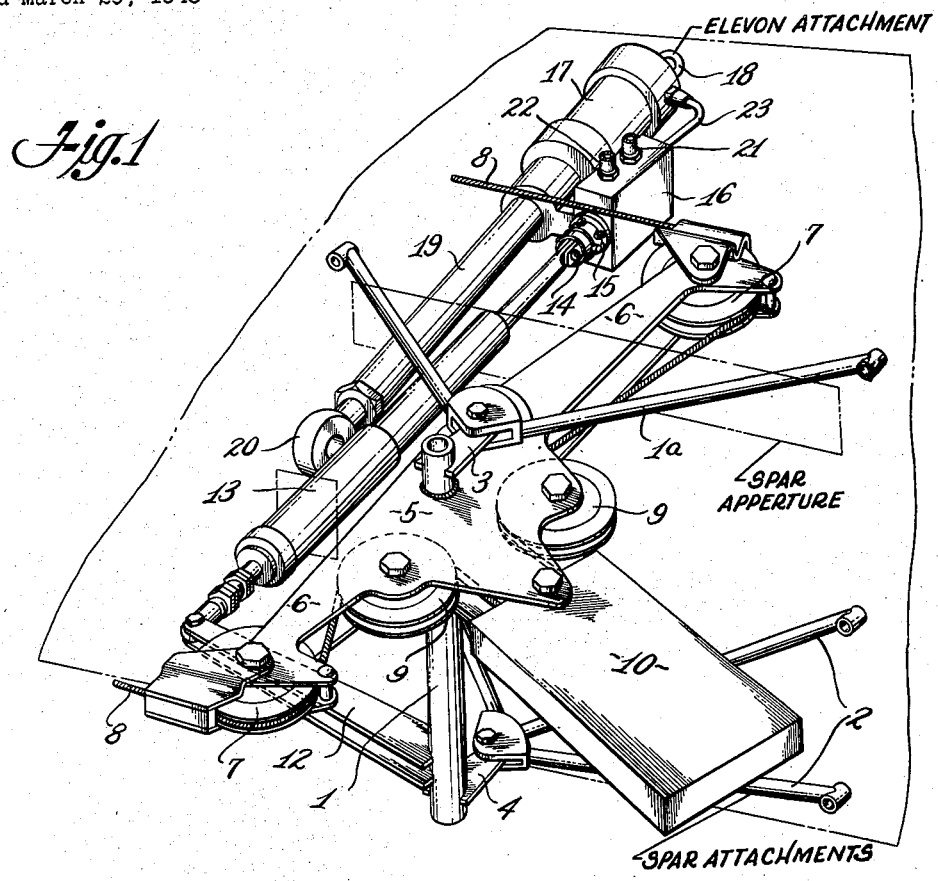
Figure 1 is a perspective view of one preferred form of the present invention as installed to control an elevon for pitch, climb and roll control on a large airplane such as the XB–35 described above.

Referring first to Figure 1, which shows in perspective view an actual installation of a hydraulic motor as used to operate an elevon, a vertical axle 1 is placed within a wing panel, for example, and pivoted to wing spar attachments 1a and 2 at each end thereof respectively, by short bellcrank arms 3 and 4 respectively. Above, axle 1 carries a pulley plate 5 extended to cross arms 6 carrying end pulleys 7 over which run control cables 8 to be operated by the pilot from the control column or stick as may be utilized. Cables 8 pass around tension box pulleys 9 to enter a cable tensioning box 10 attached to the pulley plate 5 as is well known in the art. Rotation of axle 1 by the pilot moves long bellcrank arm 12 which is attached to a spring loaded valve operating rod 13 passing through an aperture in the wing spar to link with a valve attachment 14. The spring load in rod 13 is such that the rod will extend or contract to protect the attached valve is manned by the pilot with no hydraulic pressure available to cause the surface to follow up the control column movement for example.

Valve attachment 14 enters a valve assembly 15 inserted in a valve block 16 securely fastened to one end of a hydraulic motor cylinder 17, the other end of cylinder 17 being attached to an elevon operating arm (not shown) by elevon attachment 18. A hydraulic piston rod 19 enters cylinder 17 opposite elevon attachment 18 and is attached to a wing point by wing attachment fitting 20. Piston rod 19 is, as is well known in the art, attached to a hydraulic piston (not shown) inside of cylinder 17.

Valve block 16 is provided with a hydraulic fluid pressure inlet 21 and a fluid return pipe 22. The piston rod end of the cylinder 17 is supplied with fluid through the valve block, and the closed end of the cylinder is supplied through the block and through outside pipe 23.

In operation, it will be noted that as the cylinder is attached to the elevon operating arm and the piston rod to the wing, and the valve and valve block is attached to the cylinder, with the valve operating rod 13 coming from the wing, that no mechanical feedback link is needed. With the valve operating rod 13 in neutral position the elevon is held in position. When the valve operating rod 13 is moved by the pilot, fluid is admitted to one or the other sides of the piston with the opposite side of the piston open to the fluid return. The cylinder then moves in accordance with the pressure application and the aileron moves. As it moves, however, the valve also moves as it is attached to the cylinder. When the neutral point within the valve is reached the elevon movement stops. Thus, the cylinder and, consequently, the elevon will follow all pilot initiated movements of the valve operating rod 13. The extremely short feedback circuit created by the attachment of the valve to the cylinder with the cylinder moving with the aileron effectively prevents hunting. This type of operating connection, however, is not part of the present invention, being described and claimed in the copending U. S. application cited above.

In the motor system described above, all of the requirements outlined above for successful operation of the motor itself are attained by the design and construction of valve assembly 15 to embody the present invention. One form of successful valve is shown in Figures 2 and 3 which will next be referred to.

Valve assembly 15, one end of which projects from valve block 16 in Figure 1, comprises a spool casing 24 adapted to be fastened into valve block 16 and an inner spool 26 to be moved by valve operating rod 13. The spool casing starts, at the left of the figures, with a hollow spool slide end 30 followed by a barrel portion 31 of uniform outer diameter to terminate in a threaded end 32. These three portions are separate and abut with ground faces so that slide end 30 can be attached to valve block 16, and the entire spool casing tightened up by screwing threaded end 32 into the valve block 16.

The inner terminus of slide end 30 is provided with opposed ports 35 entering a return chamber 36 which is separated from a slide chamber 37 in this end by a partition 38 bored out to pass a spool rod 39 attached outside of partition 38 to slide 40 in turn attached to valve rod 13. Slide 40 is held to a fixed travel by slide pin 41 attached to slide end 30 and passes through elongated hole 42 in the slide 40. A spool rod packing 43 of the O ring type is installed in partition 38. Spool rod 39 is attached by spool pin 44 to the spool 26 sliding inside of spool casing 24. Spool pin 44 is in line with ports 35 for easy assembly. Spool 26 will be described later.

Figure 2:
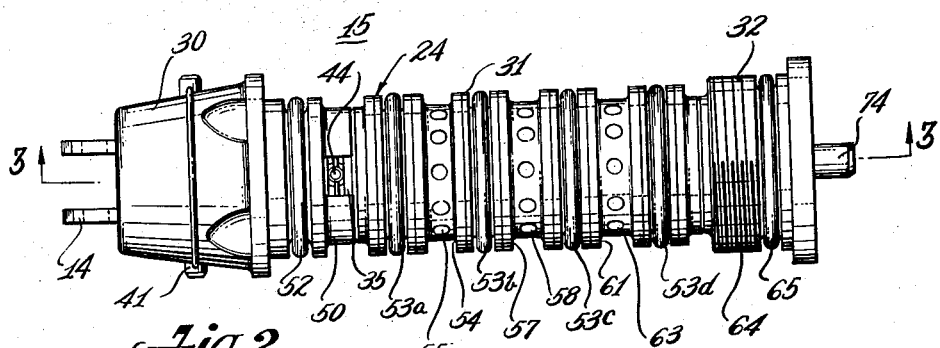
Figure 2 is a view in elevation of the valve assembly used in the system shown in Figure 1.

On spool casing 24, as shown in Figure 2, connecting opposed ports 35 is a peripheral return fluid groove 50, which when the valve assembly is in place in valve block 16, communicates with fluid return pipe 22 on the valve block through return bore 51. An outer slide-end packing seal 52 isolates return fluid groove 50 from the outside of the valve block.

To the right of the return fluid groove 50 is an outer ring seal 53a separating fluid return groove 50 from one cylinder chamber groove 54 having circumferential cylinder ports 55 therein communicating with inner cylinder chamber groove 56 (Figure 3) facing the spool 26. Another outer ring seal 53b followers, then an outer pressure fluid groove 57, communicating with the interior of the spool casing without an inner groove by pressure ports 58.

The outer pressure fluid groove 57 connects through valve block 16 with pressure inlet 21 through pressure bore 60.

Next is still another ring seal 53c followed by a second outer cylinder chamber groove 61 connecting with an inner second cylinder chamber groove 62 by circumferential cylinder ports 63. A fifth ring seal 53d follows. Next comes the threaded end 32 with threads 64 sealed from the outside by threaded end ring seal 65.

Threaded end 32 is provided with a threaded end return fluid chamber 70 connecting with slide end return chamber 36 by threaded end ports 71 through a central spool bore 72 and slide end ports 73. These ports 73 connect with return groove 36, bore 51 and then to return pipe 22.

Both ends of spool 26 are exactly alike, the spool being attached at the threaded end to a spool idler rod 74 by idler pin 75. Idler rod 74 passes through the threaded end 32 and is sealed by idler pin seal 76 mounted in the threaded end. As the exposed face sections at each end of spool 26 are the same, and the rods are the same diameter, no piston effect is applied by the return fluid pressure.

The detailed construction of the spool shown in Figure 3 will next be described. Opposite pressure ports 58 leading to outer pressure fluid groove 57 the spool is cut away to form a circumferential fluid distributing groove 77 extending equal distances, when the spool is in neutral position, on each side of pressure ports 58. This distributing groove 77 is provided with sides normal to the surface of the bore in which the spool slides, and a plurality of circumferentially distributed pressure bores 78 and 79 extend longitudinally in the spool wall from respective side of the pressure distributing groove 77 a sufficient distance to terminate beyond the near sides of inner first and second cylinder chamber grooves 56 and 62 in the spool casing.

Both ends of the spool 26 are also cut away opposite return fluid chambers 36 and 70 to form shoulders which also have circumferentially spaced return bores 82 and 83 respectively, extending longitudinally in the spool 26 past the opposite sides of the inner first and second cylinder chamber grooves 56 and 62 respectively.

The spool construction is completed by four sets 82a, 78a, 79a and 83a of flow holes bored normal to the peripheral surface of the spool and entering the various bore holes 82, 78, 79 and 83 respectively. The flow holes are bored with definite patterns with respect to the various inlets and outlets of casing and spool. These flow holes pass all the liquid flow through the valve, as slide pin 41 limits the travel of the spool to less than the travel required to open pressure groove 77 on the spool to either of the inner cylinder chamber grooves 56 or 62. Thus the only flow is through the flow holes. As a strong shearing action can take place between the valve casing and the spool at the flow holes, which will minimize the possibility of the spool jamming due to particles entering the holes, it is preferable to harden the spool and casing surfaces, as for example to Rockwell "C" 53–58, and to make all parts of material having the same temperature coefficient of expansion to avoid binding between operating temperatures of from −65° F. to 165° F. for example.

Figure 4:
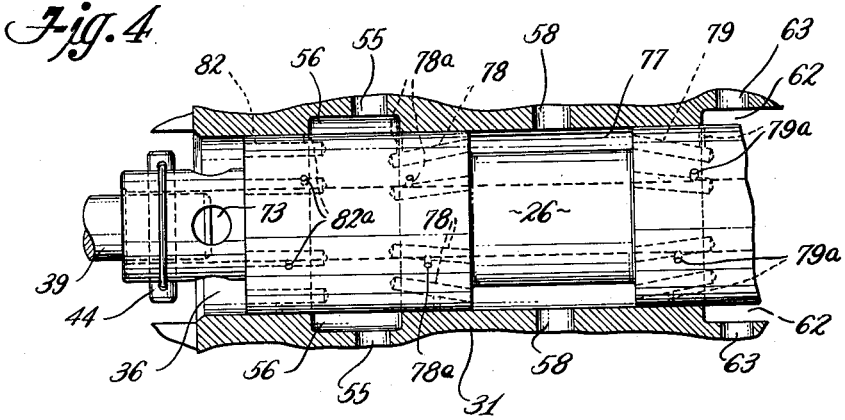
Figure 4 is a diagram showing the flow hole arrangement of the spool of Figure 3.

In the form shown in Figure 3, Figure 4, and Fig. 4a, the flow holes are arranged in a pattern spirally spaced around the periphery of the spool. The spiral pattern of the flow holes 82a, 78a, 79a, and 83a is made such that a desired cylinder control flow is obtained, with a predetermined neutral leakage, an ample but restricted flow at all times, this restricted flow increasing in volume as the spool is moved in either direction.

In Figure 3, the spool is shown in neutral position. The rows of flow holes 78a and 79a nearest to the pressure inlet 60 are arranged so that one hole only of each row is bisected by the more central shoulders of cylinder grooves 56 and 92, respectively. The rows of flow holes 82a and 83a are arranged so that one hole only of each row at the return flow grooves 56 and 62 is bisected by the outer shoulders of return flow grooves 56 and 62 respectively. Thus, a small fluid flow is constantly applying pressure to both ends of cylinder 17 through the centrally bisected flow holes. The fluid then leaks to the return by the same amount through the bisected flow holes in rows 82a and 83a. This arrangement is more clearly shown in Figure 4. In one preferred form, a pressure of 2000 p. s. i. is used in pressure inlet 60 and the bisected flow holes are proportioned to provide a pressure drop of 1000 p. s. i. In consequence, there is at all times, in the neutral spool position, a preload of 1000 p. s. i. on both sides of the cylinder piston, thus preventing motion of the attached control surface under shock conditions.

A minute movement of the spool of only about .007″ in the case of the use of .013″ flow holes will close the normally bisected flow holes on one side of the spool and open the other normally bisected holes. Then fluid flow to one side of the piston will be made at a highly restricted rate as determined by the pressure and hole diameter so that the piston moves very slowly. Further motion of the spool will uncover more holes in the patterns on one side of the spool neutral, the opposite holes remaining closed so that an increasing but still restricted flow will be obtained to move the piston faster.

Figure 7:
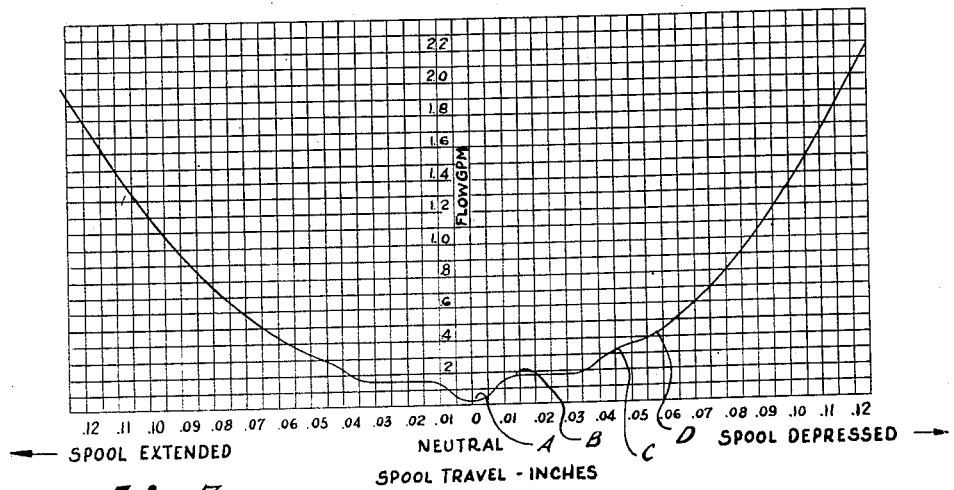
Figure 7 is a coordinate diagram showing flow in gallons per minute as plotted against spool travel away from neutral in the valve shown in Figure 3 or 5.

Here, one section of the spool 26 as shown in the diagrammatic Figure 4 is illustrated as having closely grouped flow holes rather than the spiral pattern shown in Figures 3, 4 and 4a. In Figure 5, the spool plug controlling the flow of fluid through cylinder chamber grooves 54 and circumferential cylinder ports 55, i. e., the same plug as shown in Figure 4a, is undercut to provide opposite fluid channels 92, these undercuts taking the place of bore holes 78 and 82, shown in Figures 3 and 4, to connect the bore holes with the open pressure groove 77 on the spool 26. A plurality of fine flow holes 93 are then drilled radially, grouped in a predetermined longitudinal pattern, connecting the spool periphery with the fluid channels 92. The nearest of these holes 93a in each pattern are drilled so that they will be substantially bisected by shoulders 91 of the groove 54 when the spool plug is in neutral position. This is not a delicate machine operation as the shoulders can be machined to close tolerances and the holes accurately located and drilled. Additional holes are then drilled outwardly from the first holes to be progressively uncovered as the spool is moved, as, for example, in a relatively close pattern such as shown in Figure 6. In one specific example, 6 holes are used in each pattern, each .013″ in diameter. This is sufficient, under 2000 p. s. i. fluid pressure, to provide a full flow of up to 4 g. p. m. with all six holes uncovered for example which is sufficient for action of the cylinder piston for aileron control. The neutral leakage can be made less than .01 g. p.m. but still sufficient to provide preload for the cylinder piston. The hole pattern can, of course, be changed as desired to get any desired relation of restricted flow and spool travel. The result of actual flow measurement of one specific valve made in accordance with the hole pattern of Figures 5 and 6 with respect to spool travel, is shown in Figure 7, only the lower part of the curve being shown. This curve closely resembles curves found for the device of Figure 3 or Fig. 5.

Here the neutral leakage is clearly shown at A with a flow rate of about .02 g. p. m. as the holes are bisected. Then as the spool is moved so that one hole is completely open with the opposite hole completely closed in both pressure and return channels, the flow rises to about .15 g. p. m. with the spool moved in one direction and about .18 g. p. m. in the other direction, with a spool travel of only about .015". The effects of uncovering additional flow holes just beyond the first flow hole is shown at points B, C, and D and thereafter the effect of individual flow holes is not discernable. It will be noted that the curves on each side of the neutral point are remarkably alike, so alike in fact, that the pilot cannot detect the difference of response to control column movement in opposite directions. At the same time it will be noted that the response is extremely sensitive so that the pilot can make very small movements of the control surface. Obviously, however, response speed can be regulated by the flow hole patterns to get any curve desired.

Still another type of suitable valve construction particularly useful for low flow rates is shown in Figures 8 and 9 which will next be referred to. In this case the valve spool 100 accomplishes the desired characteristics of providing a restricted flow increasing with spool travel, by having spool portions 101 and 102 facing valve block cylinder grooves 103 and 104 respectively provided with ground bevels 105 on each side thereof as shown in Figure 8. The central bevels 105a open into pressure inlet 60 in valve block 16 and the lateral bevels 105b (Figure 9) open into return port 51, one of them through the central bore 72 of the spool as in the embodiment previously described, the other directly. As shown in exaggerated form in Figure 11, the bevels 105 are positioned to provide a balanced preload flow to both sides of the piston as in the previous embodiment. with flow increasing as the spool is moved, due to the effective enlargement of the connection between the pressure inlet and cylinder ports on one side, with closure of the bevel on the opposite side of the cylinder grooves. It is to be noted that in order for this action to take place in either the bevel or the hole type of valve, the major proportion of the areas of those portions of the spools 26 and 100 contacting the valve block adjacent cylinder grooves 54—62 and 103—104, respectively, is at neutral, in fluid-tight overlap contact with the valve block surface with respect to said grooves. However, certain restricted and minor no-contact areas of the surfaces of spools 26 and 100, at the edges of the grooves however, always underlap the grooves at the neutral position. This is evidenced by the equal underlap of one half of holes 93a in spool 26 at neutral, as best shown in Figure 5; and by the equal underlap of the inner ends of bevels 105a and 105b of spool 101 when the spool 101 is in neutral, as best shown in Figure 9. It is only the no-contact underlap in both cases at the neutral position that creates the channels whereby the controlled neutral leakage and preload flow can take place. In both instances immediate overlap of the bevel or flow hole on one side of the grooves and cessation of flow takes place as the spool is moved to increase underlap and resultant flow on the other side of the grooves.

For flow rates up to and including about 4 g. p. m. the bevel type of valve has proved highly satisfactory. At flow rates substantially higher, a spool centering force may develop due to Venturi action of the fluid at the ports, the forces developed being in opposition to the pilot initiated movement of the spool. At such higher flow rates the embodiments of Figures 2 and 3 and 5 and 6 are preferred as in those embodiments the flow through the flow holes is at right angles to the movement of the spool and any forces developed due to the flow are not aligned with the direction of spool travel to cause any spool centering forces.

For maximum flight safety, the hydraulic control motor such as shown in Figure 1 is usually installed in duplicate so that in case of failure of one valve or motor, the other valve and motor can be still operated even though the two motors are connected together through the control surface as shown diagrammatically in Figure 10.

Here the pilot's control column 120 and co-pilot's control column 121 are interconnected and to control cables 122 and 123 leading to hydraulic motor X and to hydraulic motor Y, the cables being connected to operate both control valves thereof simultaneously. If one of these valves should jam it is highly desirable for the other valve to remain operable, and further, the jammed valve should be so constructed and arranged that it cannot produce a hydraulic lock in the motor cylinder. To take care of this contingency a pressure release system is provided whereby even though the spool of one motor is jammed, the valve of the other motor can still be operated, and any hydraulic lock prevented in the damaged motor. One form of suitable release valve is shown in Figure 10 as used in conjunction with the bevel type valve, which, due to the bevel angles is somewhat more susceptible to jamming than is the valve of Figure 3 which has shearing edges adapted to shear particles entering the flow holes. However, it may be desirable from a maximum safety standpoint to also provide the valve of Figure 3 with a pressure release assembly, but to avoid duplication, the pressure release mechanism will be described only as applied to the valve of Figure 9. Its use, however, in the valve of Figure 3 will be apparent to those skilled in the art.

In Figure 9 the valve spool is composite, comprising an outer spool portion 110, an inner spool portion 111 and an intermediate spool portion 112. Outer spool portion 110 slides within the spool casing 16, being sealed by opposite O rings 114 and 115.

Opposite pressure inlet 60 the outer spool portion 110 is grooved, the groove 116 having a longitudinal extent of substantially the diameter of the pressure inlet 60. Opposite cylinder grooves 103 and 104 machined in valve block 16, the outer spool oportion 110 is provided with pressure relief ports 117 and 118 respectively, these ports being opposite but slightly smaller in diameter than the cylinder grooves 103 and 104. The bevels 105 are so proportioned and arranged on the spool periphery to give a small neutral flow from the pressure inlet 60 to each cylinder groove 103 and 104 and from each cylinder groove to the return outlet 51. In one instance this return flow is direct to a return groove 120 on the outer spool portion and in the other instance it is through opposite return port 121, through the central bore 72 and through additional and preferably aligned return ports 122 in the three spool portions.

Inwardly of pressure groove 116 and pressure relief ports 117 and 118 the intermediate spool portion 112 is cut out to form a valve chamber 124 divided longitudinally by a floating ring 125 which has a close fit to the outer spool portion 110 but a loose fit to inner spool portion 111. This ring is sealed, however, to the inner spool portion 111 by an inner O ring 126.

In the valve chamber, on each side of floating ring 125 is positioned a poppet valve 127, each one urged outwardly from the floating ring 125 by a valve spring 128. One poppet valve bears against an end shoulder 129 on the outer spool portion 110 and the other poppet valve bears against a shoulder 130 on the intermediate spool portion 112. Both valves normally form fluid pressure seals with their respective bearing shoulders 129 and 130.

Just beyond the seals the poppet valves are restrained from further outward movement by snap rings 131 mounted on the inner spool portion 111.

As there is a space between shoulders 129 and 130 and the opposite snap-rings 131 and as the poppet valves are cut away to provide a path from the cylinder ports 117 and 118 any opening of a poppet valve will provide a free flow of liquid from the connected side of the cylinder piston into the return line via the normal return flow. The poppet valves are sealed as they move on inner spool portion by poppet ring seals 132.

The intermediate spool portion 112 is assembled on the inner spool portion 111 after the poppet valves and springs are installed. The inner spool portion 111 is thus free to move against poppet spring force and is sealed against end leakage by end seals 133. The combined inner and intermediate spools are then inserted into outer spool portion 110 and locked in place by end nuts 135 bearing against locking and seal rings 136. A tight fit is provided at shoulder 129 to prevent leakage between spool portions 112 and 110. The inner spool 111 is then extended to connect with a valve operating rod as for example rod 13 (Figure 1).

The entire composite spool is inserted in the valve block and is then movable for normal fluid control through opposed poppet valve springs 128 and unbalanced pressure upon poppets. If, however, the connected outer and intermediate spool portions should jam at any point in its travel, the inner spool portion can still move by compressing one or the other of the valve springs through snap rings 131 and the poppet valve involved. This opening of the poppet valve will open the pressure side of the cylinder to the return, and as the other side of the valve is already open to the return, fluid is free to circulate in and out of the return if and when the cylinder is moved by the other hydraulic motor through the attached control surface, thus preventing a hydraulic lock. The total permitted travel of the inner spool is made sufficient to permit full stroke operation of the other motor valve spool so that with one valve jammed, control surface operation can still be obtained. This is an important safety feature and insures uninterrupted operation of the control surfaces at all times when proper hydraulic pressure flow is available.

As it is usually customary in military airplanes to provide an emergency surface operating system, usually electrical in case of failure of the hydraulic system, as the pilot's controls are moved to operate the electrical system, the valve spools are also operated preventing hydraulic lock. If both of the valve spools are jammed, thereby making use of the emergency system obligatory, the poppet valves will open in the proper direction to prevent hydraulic lock.

The tension of the poppet valve springs are adjusted so that as far as these springs are concerned spring loaded valve operating rod 13 (Figure 1) at all times acts as a solid rod. In practice with one form of valve as described the poppet valve springs are set to remain closed under pressure of not less than 25 lbs., and to be opened by a load not exceeding 45 lbs. for example, where the spring load of spring loaded rod 13 is approximately 85 lbs.

From the above description it will be seen that several types of valves can satisfy the requirements for a full powered operation of airplane control surfaces and the principles common to these embodiments have been clearly pointed out. In consequence, the preferred embodiments have been described herein as being illustrative only and not by way of limitation of the principles of the present invention.

Reference has been made herein to the pilot of the airplane as being human. Obviously, however, when automatic piloting devices are used to take over control column movements, no difference in results obtained by the present invention will be found.

Furthermore, while the invention has been described as being ideally adapted for use in a control system for airplane surfaces, it will be obvious that the advantages of the invention as described herein can be put to many other uses. Such uses within the knowledge of those skilled in the art are deemed to be included in the scope of the appended claims.

What is claimed is:

1. In a hydraulic motor valve having a casing, a fluid pressure inlet port adaptable for connection to a source of fluid under pressure, a return fluid port, a pair of cylinder connection ports and an inner casing surface, a spool movable within said casing along said surface in either direction from a neutral position, said spool having major peripheral surface areas in fluid-tight contact with said inner casing surface and overlapping all of said ports to block fluid flow between said ports, said spool being provided with a plurality of flow hole groups positioned in said spool to conduct fluid from said pressure inlet port to each of said cylinder connection ports and from said cylinder connections to said return fluid port, one of the flow holes in a group on each side of said pressure inlet being positioned to pass fluid equally to said cylinder connection ports in neutral position of said spool and one of the flow holes in each group between said cylinder connection ports and said return fluid port being positioned to pass fluid equally in neutral position of said spool, the remaining flow holes in each group being covered by said casing, thereby providing a predetermined balanced neutral leakage and piston preload, additional holes in each group on one side of said spool becoming progressively uncovered by motion of said spool in one direction, all other holes becoming covered, thereby providing a gradually increasing rate of fluid flow.

2. In a hydraulic motor valve having a casing, a fluid pressure inlet port adaptable for connection to a source of fluid under pressure, a return fluid port, a pair of connection ports and an inner casing surface, a spool movable within said casing along said surface in either direction from a neutral position, said spool having major peripheral surface areas in fluid-tight contact with said inner casing surface and overlapping all of said ports to block fluid flow between said ports, said areas blocking fluid flow being provided with at least four flow hole groups, one of said groups being positioned to pass fluid from said pressure inlet port to one of said connection ports, a second flow hole group positioned to pass fluid from said pressure inlet port to the other connection port, a third flow hole group being positioned to pass fluid from one of said connection ports to said return fluid port, and a fourth group positioned to pass fluid from the other connection port to said return fluid port, at least one flow hole in each flow hole group underlapping one of the ports connected thereby by an equal amount to pass equal amounts of fluid with said spool in neutral position, the remaining flow holes in all flow hole groups being overlapped by said casing in neutral position, all of said flow hole groups having substantially the same flow hole pattern, the remaining flow holes in the flow hole groups on one side of said pressure inlet port being positioned to be progressively uncovered by movement of said spool, all other flow holes being positioned to be covered by said motion.

3. Apparatus in accordance with claim 2 wherein said flow holes are positioned to extend substantially radially in said spool at the periphery thereof.

4. Apparatus in accordance with claim 2 wherein said flow holes are positioned substantially radially in said spool at the periphery thereof, said flow holes have a diameter on the order of .013", said flow hole groups provide a restricted flow of less than .1 g. p. m. at the neutral position with an increase up to 8 g. p. m. with all flow holes uncovered on one side of said spool, and said flow holes are positioned with respect to casing ports to provide flow therethrough susbtantially at right angles to the direction of spool movement at said ports.

5. Apparatus in accordance with claim 2 wherein the flow holes are positioned to extend substantially radially in the spool at the periphery thereof and are spaced around the periphery of said spool to form spiral patterns.

6. Apparatus in accordance with claim 2 wherein the flow holes are positioned to extend substantially radially in the spool at the periphery thereof and to be closely adjacent in each group on the periphery of said spool and are staggered in each group to be serially uncovered by spool motion.

7. In a hydraulic motor valve having a casing, a fluid pressure inlet port adaptable for connection to a source of fluid under pressure, a return fluid port, a pair of connection ports and an inner casing surface, a spool movable within said casing along said surface in either direction from a neutral position, said spool having a major peripheral surface area in fluid tight contact with said inner casing surface and overlapping all of said ports to block fluid flow between said ports, said spool, including the remainder of said peripheral surface, being cut away to form a plurality of channels, said channels being positioned on said spool to form a fluid connection at the neutral position of said spool between said pressure inlet port and each of said connection ports, and a fluid connection between each of said connection ports and said return port, each of said channels having a portion underlapping one of the ports connected thereby by an equal amount at said neutral position to provide a predetermined balanced neutral leakage into and out of said connection ports, each of said channels also having a cross-sectional area increasing in discrete increments in directions away from said neutral underlaps, the underlapped portion of the channels on one side of said ports closing immediately as the spool is moved to open the channels on the other sides of said ports, whereby as said spool is moved away from neutral, a fluid flow increasing in discrete steps is delivered into and out of said connection ports.

8. In a hydraulic motor valve having a casing with an inner casing surface, a fluid pressure inlet port adaptable for connection to a source of fluid under pressure and a pair of outlet ports, said ports being in said casing and opening on said inner casing surface, and a spool movable within said casing along said surface in either direction from a neutral position to control fluid flow between said inlet and said outlets, the improvement comprising a land mounted on said spool and having a peripheral surface area in fluid-tight contact with the inner surface of said casing to block fluid flow between said inlet port and each of said outlet ports, and a fluid connection between each of said outlet ports and the peripheral surface area of said land, each of said fluid connections opening on said peripheral surface area in a flow hole, said flow holes being spaced in the direction of spool movement to be substantially bisected by opposite edges of said inlet port at the neutral position of said spool, spool movement away from neutral in either direction increasing the cross-sectional area of one hole open to said inlet port and decreasing the area of the other hole open to said inlet port.

9. Apparatus in accordance with claim 8, wherein said connections adjacent said flow holes run at right angles to the direction of movement of said spool.

WARDE L. PARKER.

REFERENCES CITED

The following references are of record in the file of this patent:

UNITED STATES PATENTS

| Number | Name | Date |
|---|---|---|
| 526,930 | Maxon | Oct. 2, 1894 |
| 763,694 | Robinson | June 28, 1904 |
| 1,928,144 | Vickers | Sept. 26, 1933 |
| 1,967,851 | Wilson | July 24, 1934 |
| 2,359,802 | Stephens | Oct. 10, 1944 |
| 2,380,705 | Proctor | July 31, 1945 |
| 2,424,901 | Richolt | July 29, 1947 |
| 2,432,502 | Bentley | Dec. 16, 1947 |
| 2,476,763 | Pettibone | July 19, 1949 |
| 2,555,115 | Cizek | May 29, 1951 |

FOREIGN PATENTS

| Number | Country | Date |
|---|---|---|
| 378,453 | Italy | Feb. 10, 1940 |